(12) United States Patent
Nikolaev et al.

(10) Patent No.: US 7,763,229 B2
(45) Date of Patent: Jul. 27, 2010

(54) ISOLATION AND PURIFICATION OF SINGLE WALLED CARBON NANOTUBE STRUCTURES

(75) Inventors: Pavel Nikolaev, Houston, TX (US); Sivaram Arepalli, Houston, TX (US); Mark S. F. Clarke, League City, TX (US); Daniel L. Feeback, Houston, TX (US)

(73) Assignee: GB Tech, Inc., Houston, TX (US)

( * ) Notice: Subject to any disclaimer, the term of this patent is extended or adjusted under 35 U.S.C. 154(b) by 273 days.

(21) Appl. No.: 11/656,690

(22) Filed: Jan. 23, 2007
(Under 37 CFR 1.47)

(65) Prior Publication Data
US 2008/0280160 A1 Nov. 13, 2008

Related U.S. Application Data

(60) Division of application No. 11/479,672, filed on Jun. 30, 2006, which is a continuation of application No. 10/191,631, filed on Jul. 9, 2002, now Pat. No. 7,166,266.

(60) Provisional application No. 60/303,816, filed on Jul. 10, 2001.

(51) Int. Cl.
*D01F 9/12* (2006.01)
*C09C 1/56* (2006.01)

(52) U.S. Cl. .................. 423/447.1; 423/460; 977/745; 977/847; 241/16; 516/32

(58) Field of Classification Search ............. 423/447.1, 423/447.2, 447.3, 460; 977/742–754, 842–848; 241/16; 516/32
See application file for complete search history.

(56) References Cited

U.S. PATENT DOCUMENTS 6,187,823 B1    2/2001  Haddon et al.

OTHER PUBLICATIONS

Chen, et al., Cyclodextrin-Mediated Soft Cutting of Single-Walled Carbon Nanotubes, J. Am. Chem. Soc. 2001; 123: 6201-6202.*
Bonard, et al., Purification and Size-Selection of Carbon Nanotubes, Adv. Mater. 1997; 9(10): 827-831.*
Jin, et al., Characterization and nonlinear optical properties of a poly(acrylic acid)-surfactant-multi-walled carbon nanotube complex, Chemical Physics Letters 2000; 332: 461-466.*
Collins, et al., Nanotube Nanodevice, Science 1997; 278: 100-103.*
Ausman, et al., Organic Solvent Dispersions of Single-Walled Carbon Nanotubes: Toward Solutions of Pristine Nanotubes, J. Phys. Chem. B. 2000; 104(38): 8911-8915.*
Duesberg et al., "Chromatographic Size Separation of Single-Wall Carbon Nano-tubes", Applied Physics A, 67, 117-119 (1998).

(Continued)

*Primary Examiner*—Stanley S. Silverman
*Assistant Examiner*—Daniel C. McCracken
(74) *Attorney, Agent, or Firm*—Wilmer Cutler Pickering Hale and Dorr LLP (57) ABSTRACT

Disclosed are methods for isolating and purifying single wall carbon nanotubes from contaminant matrix material, methods for forming arrays of substantially aligned nanotubes, and products and apparatus comprising a plurality of nanotube structures.

5 Claims, 10 Drawing Sheets

OTHER PUBLICATIONS

Helenius et al., "Solubilization of Membranes by Detergents", Biochim. Biophys. Acta 415: 29-79 (1975).

Kagawa, "Reconstitution of Oxidative Phosphorylation", Biochim. Biophys. Acta 265:297-338 (1972).

Liu et al., "Fullerene Pipes", Science 280, 1253-1256 (1998).

Rinzler et al., "Large-scale Purification of Single-Wall Carbon Nanotubes: process, product, and characterization", Applied Physics A 67, 29-37 (1998).

Shelimov et al., "Purification of Single-Wall Carbon Nano-tubes by Ultrasonically Assisted Filtration", Chemical Physics Letters, 282, 429-434 (1998).

\* cited by examiner

ISOLATION AND PURIFICATION OF SINGLE WALLED CARBON NANOTUBE STRUCTURES

CROSS-REFERENCE TO RELATED APPLICATION

This applications claims the benefit of U.S. patent application Ser. No. 11/479,672 entitled "Isolation and Purification of Single Walled Carbon Nanotube Structures," filed Jun. 30, 2006 which is a continuation of U.S. Provisional Patent Application No. 60/303,816 entitled "Isolation and Purification of Single Walled Carbon Nanotube Structures," filed Jul. 10, 2001, which is hereby incorporated by reference in its entirety.

BACKGROUND OF THE INVENTION

The present invention relates to methods for isolating and purifying single-walled carbon nanotubes from contamination materials, such as carbon and metal catalyst particles, present in the unpurified material following production of the single-walled carbon nanotube structures. Specifically, the present invention relates to utilizing solution of suitable dispersal agents to isolate and purify individual single-walled carbon nanotube structures from a raw material including bundles of nanotube structures.

DESCRIPTION OF THE RELATED ART

There has been significant interest in the chemical and physical properties of carbon nanotube structures since their discovery in 1991, due to the vast number of potential uses of such structures, particularly in the field of nanotechnology, composite materials, electronics and biology. Accordingly, there has been an increase in demand in recent years for carbon nanotube structures for research and application purposes, resulting in a desire to produce in an efficient manner single-walled carbon nanotube (hereinafter referred to as "SWCNT") structures that are free of impurities and easily separable for their proper characterization.

The three most common manufacturing methods developed for the production of SWCNT structures are high pressure carbon monoxide ("hipCO") processes, pulsed laser vaporization ("PLV") processes and arc discharge ("ARC") processes. Each of these processes produce SWCNT structures by depositing free carbon atoms onto a surface at high temperature and/or pressure in the presence of metal catalyst particles. The raw material formed by these processes includes SWCNT structures formed as bundles of tubes embedded in a matrix of contamination material typically composed of amorphous carbon (i.e., graphene sheets of carbon atoms not forming SWCNT structures), metal catalyst particles, organic impurities and various fullerenes depending on the type of process utilized. The bundles of nanotubes that are formed by these manufacturing methods are extremely difficult to separate into individual nanotube filaments.

In order to fully characterize the physical and chemical properties of the SWCNT structures formed (e.g., nanotube length, chemical modification and surface adhesion), the contaminating matrix surrounding each structure must be removed and the bundles of tubes separated and dispersed such that each SWCNT structure may be individually analyzed. By maintaining an appropriate dispersal of individual SWCNT structures, characterization of the nanotubes formed may be accomplished in a mechanistic manner. For example, it is desirable to be able to easily analyze and characterize dispersed SWCNT structures (e.g., determine change in nanotube length, tensile strength or incorporation of defined atoms into the carbon matrix of the SWCNT structure) based upon a modification of one or more steps of a manufacturing method.

It is further highly desirable to produce individual and discrete SWCNT structures in a form rendering the structures easily manipulated for use in the previously noted fields. At best, existing methodologies capable of physically manipulating discrete material components require elements that are measured on micron-level dimensions rather than the nanometer level dimensions of conventional, partially dispersed and purified SWCNT structures. However, biological systems routinely manipulate with precise spatially oriented discrete elements (e.g., proteins) having physical dimensions on the order less than SWCNT structures. Thus, if SWCNT structures could be biologically derived so that biological "tools," such as immunoglobulins or epitope-specific binding proteins, could be utilized to specifically recognize and physically manipulate the structures, the possibility of accurately spatially orienting SWCNT structures becomes feasible. In order for this approach to be realized, the individual SWCNT structures should be substantially separated from the raw material for the optimal functioning of biological compounds during both the biological SWCNT derivitization and the manipulation processes. In other words, in order to effectively manipulate the structures, it is highly desired that the SWCNT structures be produced as individual, freely dispersed structures in an aqueous buffer system that exhibits a nearly neutral pH at ambient temperatures.

Current methods for purifying and isolating SWCNT structures from contaminating matrix surrounding the structures employ a variety of physical and chemical treatments. These treatments include: the use of high temperature acid reflux of raw material, which attempts to chemically degrade contaminating metal catalyst particles and amorphous carbon, the use of magnetic separation techniques to remove metal particles, the use of differential centrifugation for separating the SWCNT structures from the contaminating material, the use of physical sizing meshes (i.e., size exclusion columns) to remove contaminating material from the SWCNT structures, and the use of sonication to physically disrupt the raw material into its components. Additionally, techniques have been developed to partially disperse SWCNT structures in organic solvents in an attempt to purify and isolate the structures.

All of the currently available methods are limited for a number of reasons. Initially, it is noted that current purification methods provide a poor yield of purified SWCNT structures from raw material. A final SWCNT product obtained from any of these methods will also typically contain significant amounts of contaminating matrix material, with the purified SWCNT structures obtained existing as ropes or bundles of nanotubes thereby making it difficult to analyze and characterize the final SWCNT structures that are obtained. These methods further typically yield purified SWCNT structures of relatively short lengths (e.g., 150-250 nm) due to the prolonged chemical or physical processing required which causes damage to the nanotubes. Additionally, a number of isolation techniques currently utilized require organic solvents or other noxious compounds which create environmental conditions unsuitable for biological derivitization of SWCNT structures. Organic solvents currently utilized are capable of solubilizing SWCNT structures in bundles and not individual, discrete tubes. Furthermore, present isolation techniques require prolonged periods of ultra-speed centrifugation (e.g., above 100,000×g) in order to harvest nanotube structures from solvents or other noxious compounds used to remove contaminating matrix material from the nanotubes.

Figure 1A:
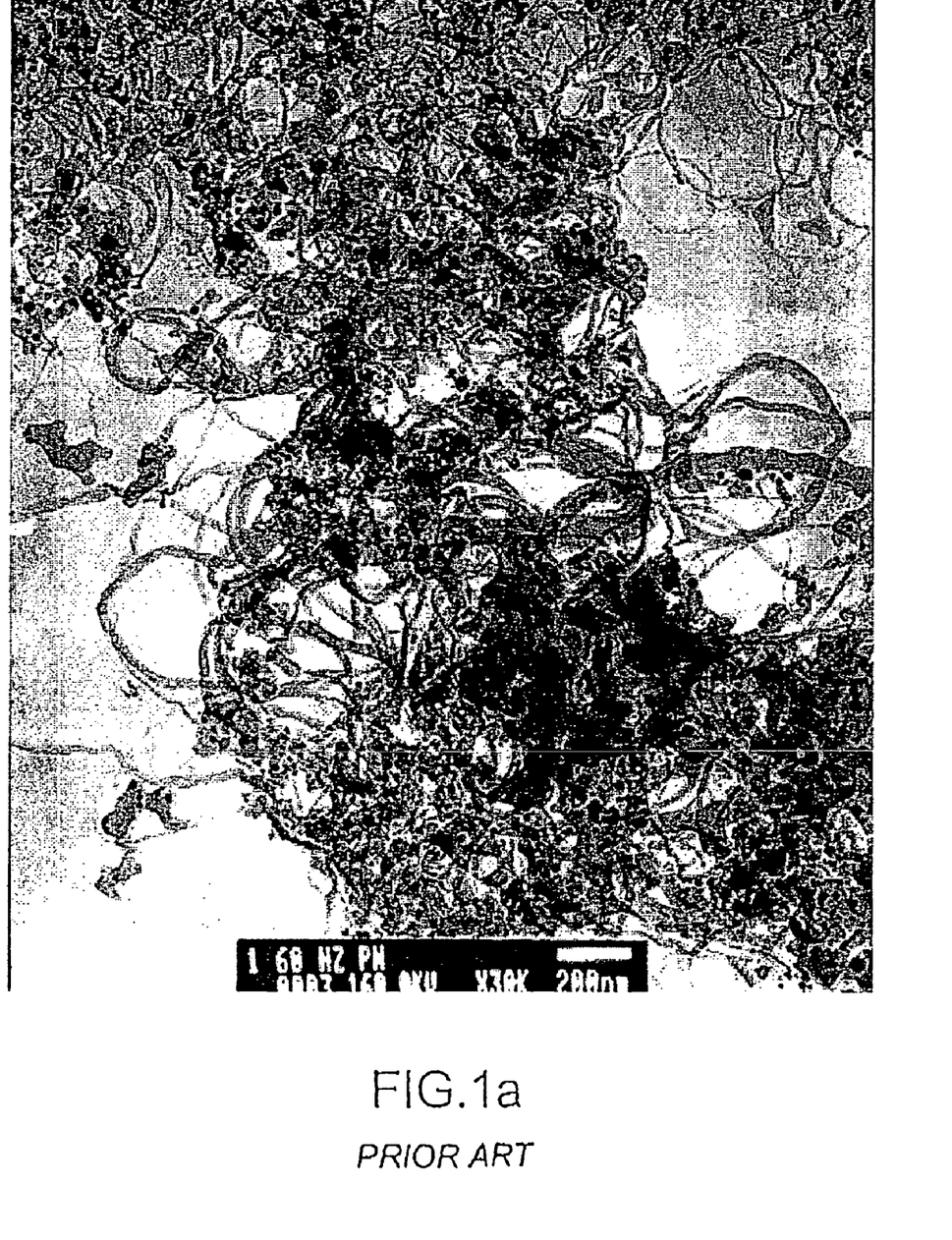
FIG. 1a is a transmission electron microscopy ("TEM") image of raw material resulting from a pulsed laser vaporization process after it is partially purified using a conventional purification process employing organic solvents. As shown in the TEM image, the raw material contains SWCNT structures and numerous metal catalyst particles and amorphous carbon material. (Scale bar=200 nm).
Figure 1B:
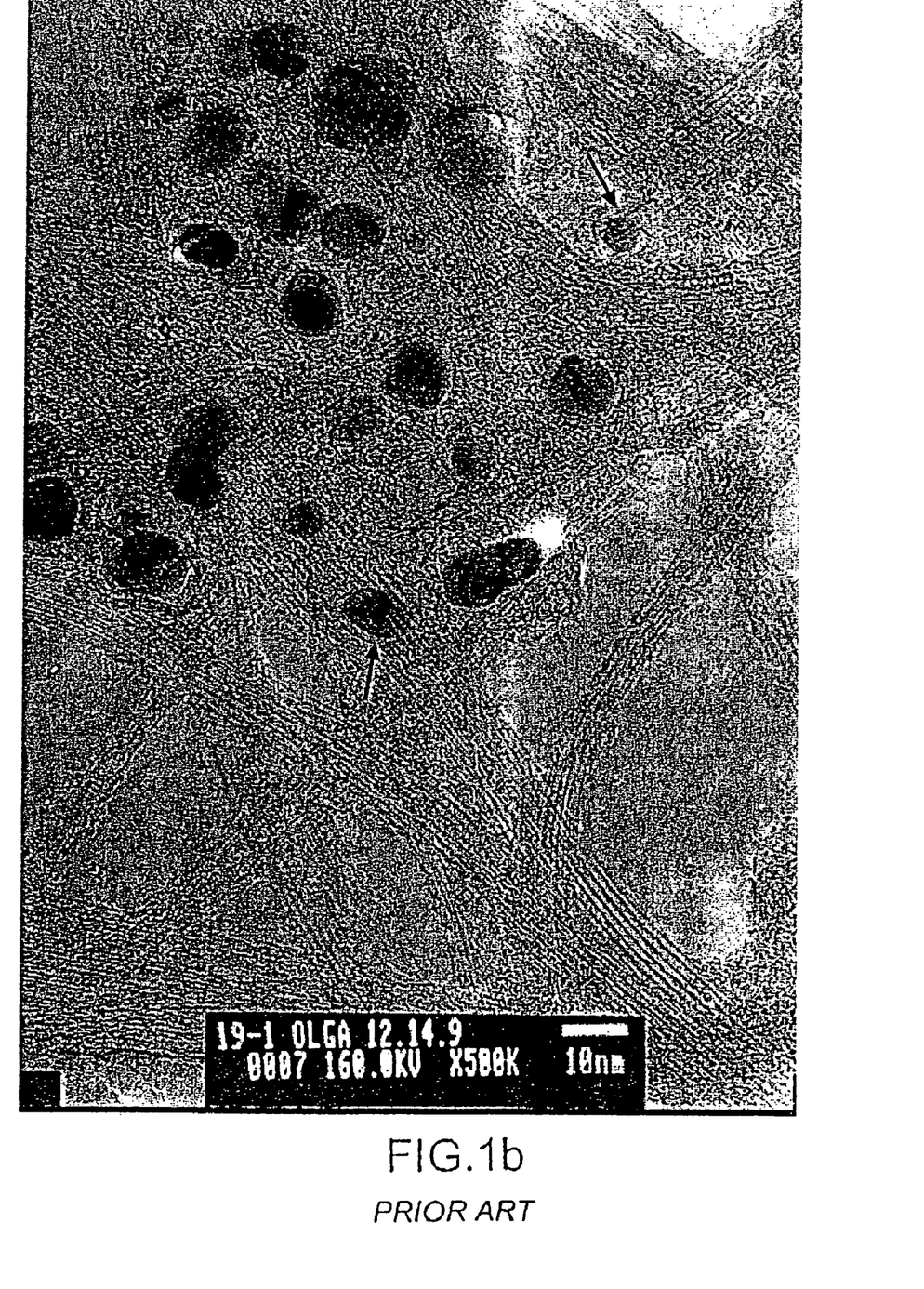
FIG. 1b is an enlargement of the TEM image of FIG. 1a. The arrows indicate metal catalyst particles which are present among a plurality of nanotube structures. (Scale bar=10 nm).

A further problem occurs during characterization analysis of the SWCNT structures. One form of analyzing SWCNT structures is through the use of transmission electron microscopy (hereinafter referred to as "TEM"), a magnification process which allows one to visualize the SWCNT structures. TEM analysis typically uses electron microscopy support films such as specialized grids made of polymeric materials, e.g., modified polyvinyl acetal resins manufactured by Chisso Corporation, Osaka, Japan, under the trademarks FORMVAR® and VINYLEC® to capture nanotube material contained in solution in a manner analogous to a filter. As liquid containing the SWCNT structures passes through a FORMVAR® grid, a layer of SWCNT structures is captured and, even if dispersed (e.g., in an organic solvent), re-associates into ropes or bundles of nanotubes. A TEM image illustrated in FIGS. 1a and 1b shows an example of the condition of SWCNT structures after purification and partial dispersion in a solution of methanol, as taught in the prior art. The SWCNT structures of FIG. 1a form tangled bundles upon deposition on a FORMVAR® grid. The image in FIG. 1b, which is a magnification of FIG. 1a, further shows the presence of metal catalyst impurities embedded within the nanotube rope structures (e.g., indicated by the arrows) which shows the inability of conventional purification methods to substantially remove contaminants from the SWCNT material.

Presently, the overwhelming problem for industrial and academic laboratories engaged in the use of carbon nanotubes for research as well as other applications is the limited source of discrete, completely separated SWCNT structures. Investigations into the vast potential of uses for SWCNT structures are being hampered by the limited supply of well characterized SWCNT structures free of significant amounts of contaminants like amorphous carbon and metal catalyst particles.

Accordingly, there presently exists a need for harvesting high yields of purified SWCNT structures from the raw material of a carbon nanotube production process in a fast and efficient manner to meet the demand for such structures. Additionally, it is desirable to provide SWCNT structures as discrete and individual structures (i.e., not bundled together), having suitable lengths and well characterized for biological derivitization and easy manipulation.

SUMMARY OF THE INVENTION

Therefore, in light of the above, and for other reasons that will become apparent when the invention is fully described, an object of the present invention is to provide a rapid and an effective method of isolating and purifying SWCNT structures disposed within a raw material containing contaminants to obtain a high product yield of quality SWCNT structures having appropriate lengths suitable for different applications.

Another object of the present invention is to provide a method of dispersing isolated and purified SWCNT structures in solution from the raw material so as to yield discrete and separated nanotube structures suitable for different applications.

A further object of the present invention is to provide a method of dispersing isolated and purified SWCNT structures in a suitable solution to render the structures suitable for biological derivitization procedures to effect easy manipulation and characterization of the SWCNT structures.

The aforesaid objects are achieved in the present invention, alone and in combination, by providing a method of dispersing a matrix of raw material including SWCNT structures and contaminants in an aqueous solution containing a suitable dispersal agent to separate the individual SWCNT structures from the matrix, thus purifying and dispersing the structures within the solution. In solution, the dispersal agent surrounds and coats the individual SWCNT structures, allowing the structures to maintain their separation rather than bundling together upon separation of the structures from the solution. Suitable dispersal agents useful in practicing the present invention are typically reagents exhibiting the ability to interact with hydrophobic compounds while conferring water solubility. Exemplary dispersal agents that can be used in the present invention include, but are not limited to, synthetic and natural detergents, deoxycholates, cyclodextrins, chaotropic salts and ion pairing agents.

The above and still further objects, features and advantages of the present invention will become apparent upon consideration of the following detailed description of specific embodiments thereof, particularly when taken in conjunction with the accompanying drawings.

DETAILED DESCRIPTION OF THE PREFERRED EMBODIMENTS

The present invention relates to a method for purifying and isolation SWCNT structures from raw material by dispersing the structures in an aqueous solution with a biologically active dispersal agent. The biologically active dispersal agent effects a separation of the SWCNT structures from contaminated material such that the purified SWCNT structures exist as a dispersion of individual and discrete SWCNT structures in solution. As used herein, the term "raw material" refers to material formed by any process for producing single-walled carbon nanotubes, including, without limitation, the three processes described above. The raw material typically contains SWCNT structures embedded in a matrix of contaminated material. The terms "contaminated material" and "contaminants," as used herein, refer to any impurities or other non-SWCNT components in the raw material including, without limitation, amorphous carbon and metal catalyst particles.

As previously noted, the current methods employed for purifying and harvesting SWCNT structures have met with limited success due in part to the traditional view of SWCNT structures as chemical compounds. In a departure from the traditional view, SWCNT structures are considered here as being similar to biologically derived structures. Some noted properties of SWCNT structures are as follows (not all of which must be present): (i) they are typically insoluble in water; (ii) they typically self associate as bundles or ropes; (iii) they are made exclusively of carbon; and (iv) each end of a carbon nanotube will typically exhibit different physiochemical properties. The physical properties of carbon nanotubes are in fact very similar to lipids, which are a class of biological compounds insoluble in water but capable of being solubilized in aqueous solutions including suitable lipid dispersing reagents. As such, the inventors recognized that SWCNT structures are readily dispersable within an aqueous solution containing a reagent typically suitable for dispersing proteins or lipids in aqueous solutions.

Reagents considered effective in suitably dispersing SWCNT structures in aqueous solution are referred to as dispersal agents. A dispersal agent can be any suitable reagent that is effective in substantially solubilizing and dispersing SWCNT structures in an aqueous solution by increasing the interaction at the surface interface between each nanotube structure and water molecules in solution. The dispersal agent is typically added to an aqueous solution in an effective amount to substantially purify and to disperse SWCNT structures in solution. The effective amount of dispersal agent will vary based upon the type of dispersal agent utilized in a particular application.

The dispersal agents are typically synthetic or naturally occurring detergents or any other composition capable of encapsulating and suitably solubilizing hydrophobic compounds in aqueous solutions. Exemplary dispersal agents include, without limitation, synthetic or naturally occurring detergents having nonionic or anionic surfactant activities such as: alkylaryl polyether alcohols, e.g. octylphenol-polyethylene glycol ether, commonly sold under the tradename, Triton® X-100 (hereinafter referred to as "TX-100") (Sigma-Aldrich, St. Louis, Mo.); phenylated polyethoxy ethanols, e.g. (nonylphenoxy) polyethoxy ethanol commonly sold as Nonidet P-40/NP-40 (Vysis, Inc., Downers Grove, Ill.)(hereinafter "NP-40"); polyoxyethylene sorbitol esters, e.g., TWEEN®, manufactured by ICI Americas, Inc., Bridgewater, N.J. and EMASOL™, manufactured by Kao Specialties Americas LLC, High Point, N.C.; sodium dodecyl sulfate (hereinafter "SDS"); and ammonium bromides and chlorides (e.g., cetyltrimethylammonium bromide, tetradecylammonium bromide and dodecylpyrimidium chloride). Other dispersal agents include, without limitation, naturally occurring emulsifying agents such as deoxycholates and deoxycholate-type detergents (e.g., taurocholic acid) and cyclodextrins (e.g., α-, β- or γ-cyclodextrin), chaotropic salts such as urea and guanidine, and ion paring agents such as sulfonic acids (e.g., 1-heptane-sulfonic acid and 1-octane-sulfonic acid).

Naturally occurring emulsifying agents such as taurocholic acid and cyclodextrins are highly effective in solubilizing and dispersing SWCNT structures and in facilitating biological derivitization of the purified and isolated SWCNT structures. In particular, cyclodextrins have a three dimensional doughnut shaped orientation with a "torsional" structure composed of glucopyranose units. The "torsional" structure of a cyclodextrin molecule allows it to attract and encapsulate a SWCNT structure within its central hydrophobic region, even when physically altered from a round "doughnut" shape to a twisted "doughnut" shape, while maintaining an outer hydrophilic surface rendering the molecule soluble in aqueous solutions. The solubility of cyclodextrins in water may also be increased nearly tenfold by substitution of, for example, methyl or hydroxypropyl groups on the cyclodextrin molecule. Greater solubility of the cyclodextrin in water translates to a greater dispersion and isolation of individual SWCNT structures in solution. Two exemplary cyclodextrin derivatives that are highly effective in dispersing SWCNT structures in solution are methyl-β-cyclodextrin (hereinafter referred to as "MβC") and 2-hydroxypropyl-β-cyclodextrin (hereinafter referred to as "2-HP-β-C"). However, it is noted that any cyclodextrin (e.g., α, β or γ), or any suitable derivative thereof, may be utilized in accordance with the present invention. Further, cyclodextrins are useful for biological derivitization of SWCNT structures which have been isolated in solution. Taurocholic acid ("TA"), which is exemplary of a suitable deoxycholate-type detergent capable of substantially dispersing SWCNT structures in solution, is produced naturally in mammalian liver tissue. It is also highly effective in facilitating biological derivitization of purified and isolated SWCNT structures because, like the cyclodextrins, TA has a molecular shape that allows a large surface area of SWCNT structures to be coated per molecule of TA. Typically, cyclodextrins and deoxycholates may be utilized to suitably disperse SWCNT structures according to the present invention in concentrations ranging from about 5 mg/ml to about 500 mg/ml of aqueous solution, and in some embodiments, in a concentration of about 50 mg/ml.

Synthetic detergents suitable for use as dispersal agents here will typically have high surfactant activity and be utilized in amounts of about 50 to about 95% of their critical micelle concentration (hereinafter "CMC") values. These high surfactant detergents are capable of overcoming hydrophobic forces at the SWCNT surface/aqueous solution interface by coating the SWCNT structures to establish suitable solubility of the SWCNT structures in solution. As appreciated by those of skill in the art, the surfactant properties of a synthetic detergent may be characterized in terms of a hydrophilic-lipophilic balance (hereinafter "HLB"), which provides a measurement of the amount of hydrophilic groups to hydrophobic groups present in a detergent molecule. In particular, synthetic detergents that are suitable for use as dispersal agents here have an HLB value between about 7 and about 13.2. Limiting the concentration of the synthetic detergent to a suitable level below its CMC will also ensure adequate dispersion of the SWCNT structures without the formation of flocculant material. Additionally, chaotropic salts (e.g., urea and guanidine) are typically utilized as dispersal agents in concentrations ranging from about 6M to about 9M in solution (wherein "M" refers to molarity), whereas ion pairing agents are typically utilized as dispersal agents in concentrations ranging from about 1 mM to about 100 mM in solution.

While selection of a suitable dispersal agent as well as a suitable concentration is important for achieving a desirable dispersion of SWCNT structures in aqueous solution, other factors may also enhance the dispersing effect of the dispersal agent. Exemplary factors that affect dispersion of SWCNT structures in aqueous solutions include, without limitation, the pH of the solution, cation concentration (e.g., sodium, potassium and magnesium) in solution, and other conditions such as operating temperature and pressure. Dispersal agent molecules typically surround individual SWCNT structures and separate those structures from bundles of tubes in solution.

The raw material containing SWCNT structures typically is added to an aqueous solution containing the dispersal agent and appropriately mixed (e.g., by mechanical agitation or blending) to ensure adequate interaction and coating of dispersal agent molecules with SWCNT structures. While the amount of SWCNT material that may be added to an aqueous dispersal agent solution to obtain an effective dispersion of SWCNT structures typically depends upon factors such as the specific dispersal agent utilized and its concentration in solution, effective dispersions have been achieved utilizing concentrations as high as about 1 mg/ml of SWCNT structures in aqueous dispersal agent solution. Upon adequate mixing, the dispersed nanotube solution, i.e., the solution containing the dispersed SWCNT structures, may be filtered with an appropriately sized filter (e.g., about 0.05 to about 0.2 μm filtration) to remove any insoluble material (e.g., matrix contaminants) remaining in solution. Typically, a 0.2 μm filter is utilized to ensure adequate removal of contaminants while preventing caking of the filter and loss of dispersed SWCNT structures. However, smaller pore size filters may also be utilized to ensure more efficient removal of contaminants. In situations where a smaller pore size filter is implemented, any SWCNT structures that may have become trapped in the filter cake may be recovered by resuspension of the cake in dispersal agent solution and repeating filtration steps as necessary to obtain a desirable yield.

Additional processing steps, such as centrifugation or other separation techniques, may also be utilized to remove insoluble material and excess dispersal agent from solution after the SWCNT structures have been suitably dispersed therein. Specifically, the SWCNT structures may be washed to remove excess dispersal agent by subjecting the solution to centrifugation at speeds ranging from about 100×g to about 10,000×g to sediment SWCNT structures. The SWCNT structures may then be removed from solution and re-dispersed in distilled water. The washing process may be repeated any desired number of times to ensure adequate removal of excess dispersal agent. The SWCNT structures may also be separated from excess dispersal agent and other contaminants in solution via dialysis or the use of an appropriate size exclusion column (e.g., a 5000 MW size exclusion column). The resultant solution, which contains substantially isolated and purified SWCNT structures coated with dispersal agent, is highly useful in a variety of applications, particularly nanotechnology research.

An additional feature relates to the removal of SWCNT structures from solution while preventing the structures from re-bundling together. Specifically, the isolated and purified SWCNT structures in dispersal agent solution may be deposited on a suitable substrate in their individual and discrete form. For example, SWCNT structures coated with dispersal agent may be deposited on a FORMVAR® grid for TEM analysis. The deposited SWCNT structures typically form substantially longitudinally aligned and substantially parallel "raft-like" or tape structures that are free of any contaminants. As used herein, "raft-like" or "tape" refers to arrays of nanotubes arranged in various geometrically ordered configurations, including configurations where individual nanotubes are placed generally parallel with respect to each other to form structures of monolayer or multi-layer thicknesses. The alignment of SWCNT structures into substantially parallel "rafts" occurs due to repulsive forces induced by the dispersal agent coated surfaces of the structures. The highly ordered and separated alignment of individual nanotubes facilitates easy characterization and manipulation of the SWCNT structures. As previously noted, current methods for isolating nanotube structures on a surface such as a FORMVAR® grid have led to a tangled mess of nanotubes having contaminated material embedded therein, as clearly indicated in FIGS. 1*a* and 1*b*. Thus, the isolation and purification methods of the present invention result in a novel formation of "raft-like" SWCNT structures. Another method for forming "raft-like" SWCNT structures is to immobilize the structures on a polyhydroxylated surface. For example, dispersal agent coated SWCNT structures may be deposited on a surface coated with polyethylene glycol, e.g., a low molecular weight polyethylene glycol ("PEG") such as CarboWax® (Dow Chemical Co., South Charleston, W. Va.). Subsequent analysis reveals that the SWCNT structures remain in isolated form.

Deposition and capture of dispersal agent coated SWCNT structures on a surface such as those previously described provides a permanent record of the structures in isolated form, which is important for conducting characterization studies of the structures utilizing AFM. AFM analysis provides a highly accurate determination of the dimensions of single SWCNT structures, including overall length and diameter. AFM further provides the spatial resolution required to both distinguish individual SWCNT structures from nanotube bundles or ropes, and allow individual SWCNT structures to be imaged along their full lengths. Utilizing AFM analysis, the dispersal agent coated SWCNT structures separated from raw material according to the present invention can be easily visualized in their isolated and purified form having lengths on the order of about 10 to about 15 μm. It is noted that previous reported SWCNT lengths utilizing other known isolation and purification techniques are on the order of only about 150 to about 250 nm. Additionally, AFM analysis reveals surface-deposited SWCNT structures coated with a dispersal agent yield "raft-like" formations in which both single layers and multiple layers, up to 4 layers thick, form on the substrate surface.

The following examples disclose specific methods for isolating and purifying SWCNT structures from raw material containing contaminants. Specifically, NP-40, TA and a cyclodextrin derivative are utilized to show the effect of each in dispersing SWCNT structures in aqueous solution. The raw material containing SWCNT structures for each example was obtained utilizing a PLV process. However, it is noted that the SWCNT structures may be isolated and purified utilizing raw material provided via other processes and still be within the scope of the present invention. It is further noted that the examples are for illustrative purposes only and in no way limit the methods and range of dispersal agents contemplated by the present invention.

EXAMPLE 1

Raw material containing bundles SWCNT structures was mixed into three synthetic detergent solutions known for solubilizing proteins and lipids in aqueous solutions. The three synthetic detergents utilized were NP-40, SDS and TX-100. These detergents were selected due to their differing physical properties and to demonstrate how the surfactant activity of the detergent affects the dispersion of SWCNT structures in solution. SDS is a strong anionic detergent that solubilizes compounds in water by virtue of coating the compounds with a layer of negatively-charged, water soluble detergent molecules. In contrast, both TX-100 and NP-40 are non-ionic detergents that function via hydrophobic interactions with the surface of a compound, thereby forming a water soluble layer of detergent molecules around the water insoluble compound. The surfactant properties (i.e., ability to decrease surface tension between aqueous and non-aqueous phases) for NP-40 are much greater than SDS and TX-100. Reported HLB values for each of these detergents are as follows (e.g., see Kagawa, *Biochim. Biophys. Acta* 265: 297-338 (1972) and Helenius et al, *Biochim. Biophys. Acta* 415: 29-79 (1975)):

| Detergent | HLB |
| --- | --- |
| SDS | 40 |
| TX-100 | 13.5 |
| NP-40 | 13.1 |

Three aqueous solutions were each prepared as follows. A 1 mg (total dry weight) amount of raw material was solubilized in 1 ml of double glass-distilled, deionized water (hereinafter "ddH$_2$O") containing one of the detergents (e.g., SDS, TX-100 or NP-40) at 50% of its respective CMC value. Each solution was subsequently vortexed for 30 minutes at room temperature. The resultant dispersions were passed through a 0.2 μm cellulose acetate filter to remove any particulate matter. Conventional spectroscopy methods were employed to measure the percent transmission ("% T") of each solution at a wavelength of 450 nm (path length of 3 mm).

The % T value of each the solutions was measured to provide an indication of solution color and to comparatively determine the ability of each detergent to effectively disperse SWCNT structures within solution. Specifically, % T values are inversely proportional to the degree of color in solution. If SWCNT structures are bundled together in a particular solution, floccular material forms which in effect remove SWCNT structures from solution by sedimentation, and thus decreases the color and increases the % T value over time. Alternatively, SWCNT structures remaining dispersed in solution would increase the solution color and thus render a lower % T value. Therefore, a lower % T value measured in the filtrate would indicate a higher level of dispersion of SWCNT material in solution.

Figure 2A:
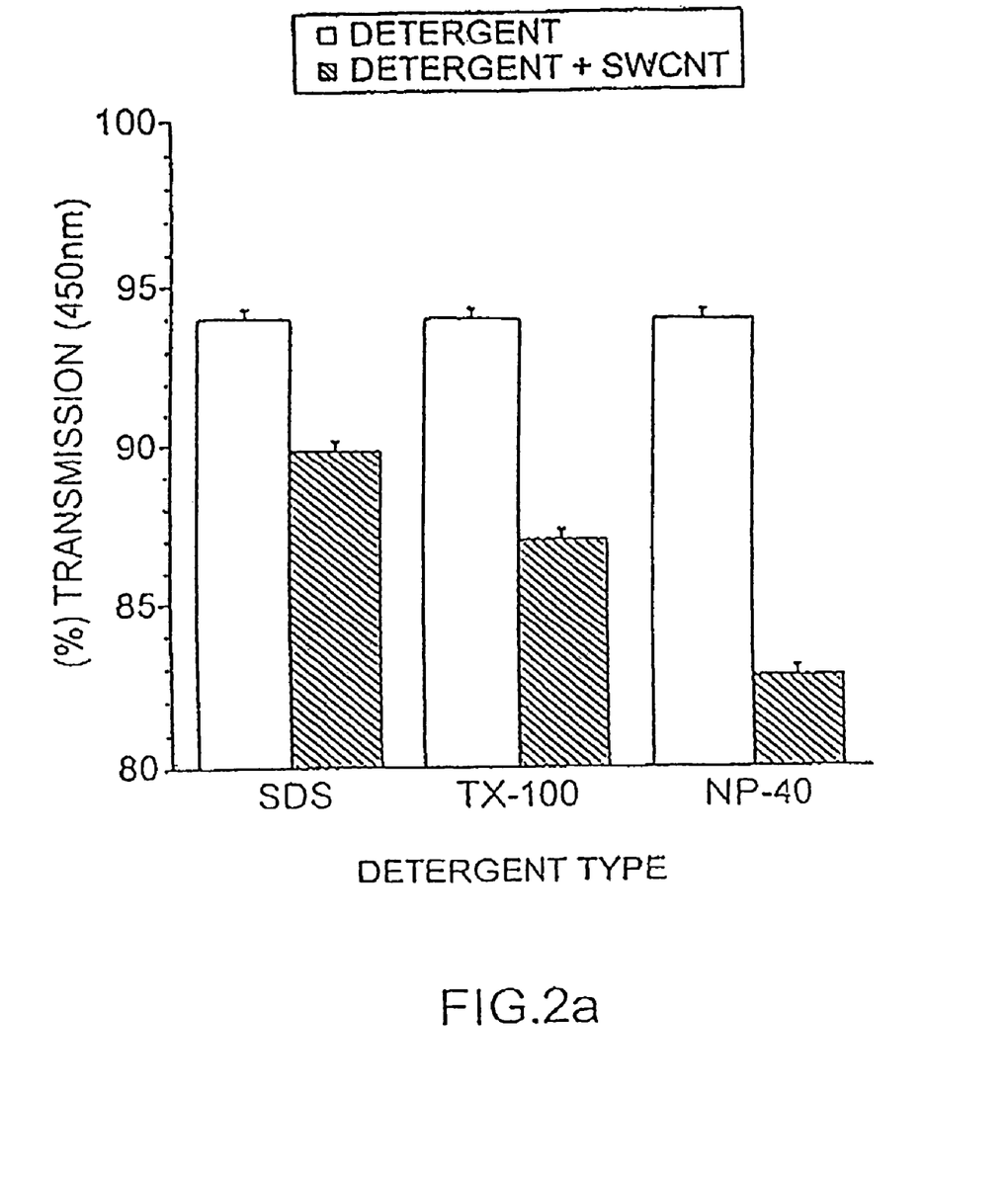
FIG. 2a is a graphical representation of percent transmission ("% T") values for aqueous solutions containing three synthetic detergents having varying surfactant strengths.
Figure 2B:
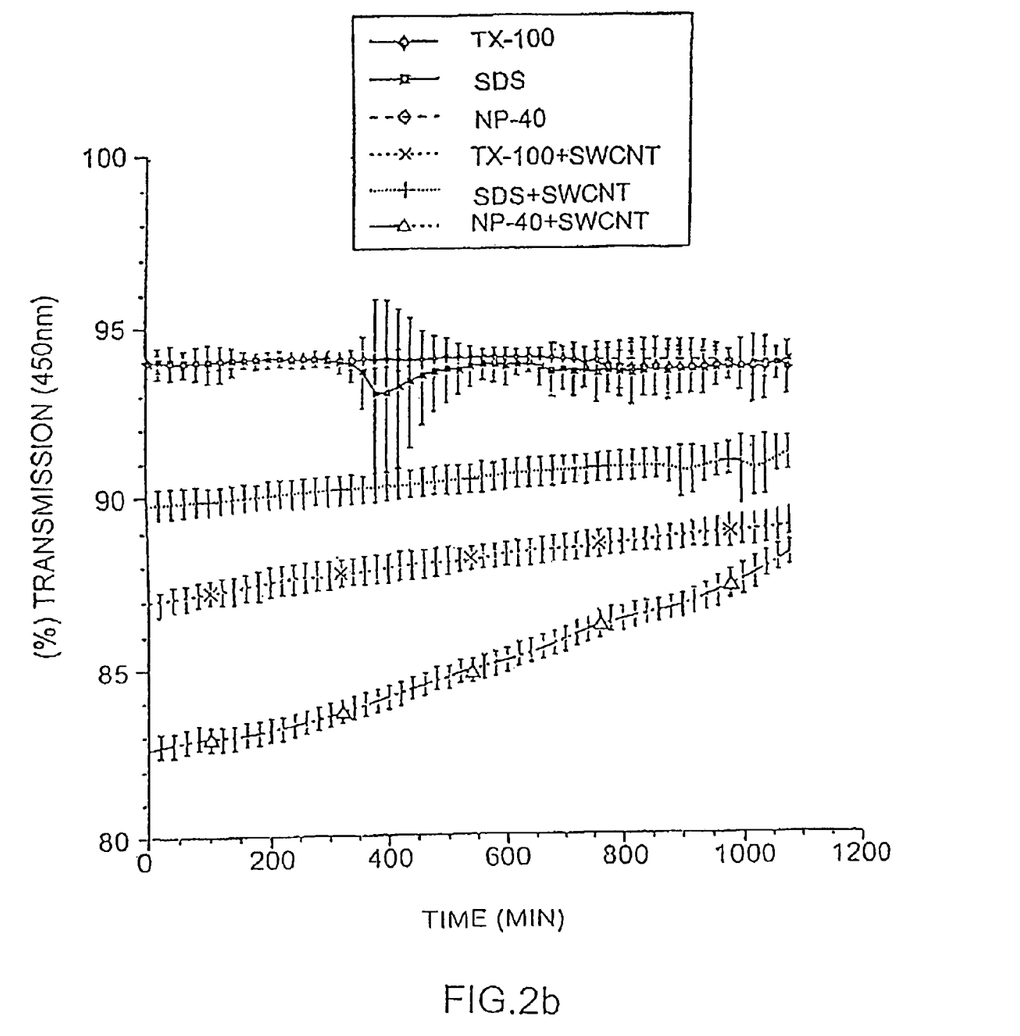
FIG. 2b is a graphical representation of percent transmission ("% T") versus time for the aqueous solutions of FIG. 2a, wherein the solutions have undergone evaporation.
Figure 2C:
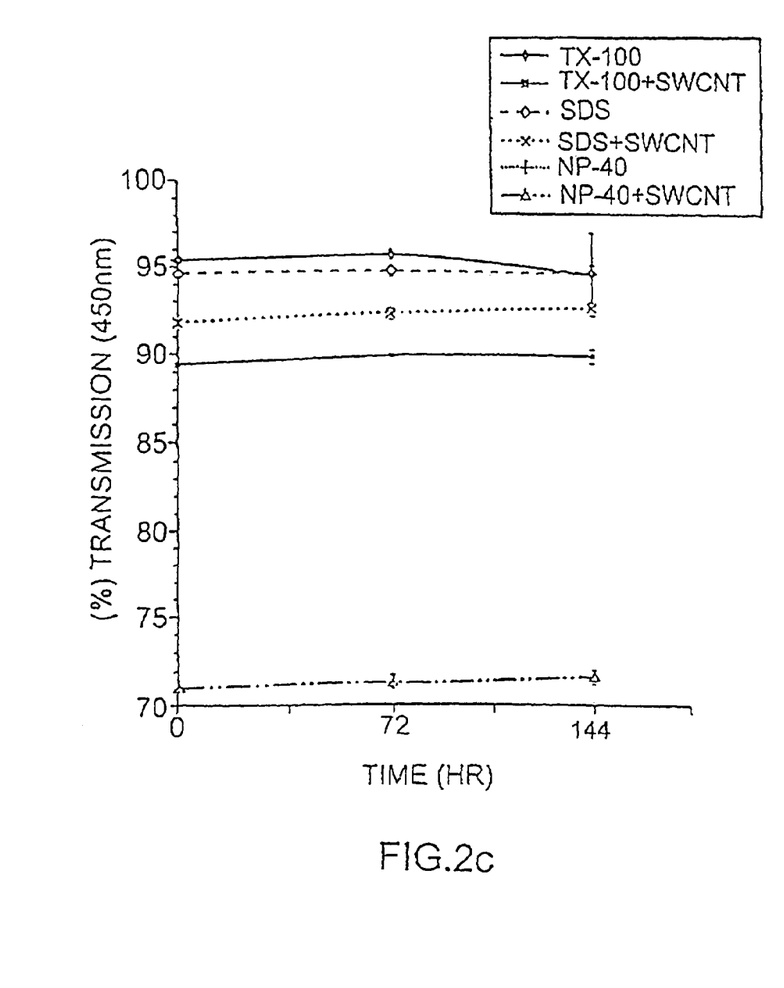
FIG. 2c is a graphical representation of percent transmission ("% T") versus time for aqueous solutions of FIG. 2a, wherein the solutions have undergone no evaporation.

The plots illustrated in FIGS. 2a-2c provide % T data for solutions containing SDS, TX-100 and NP-40, respectively, with and without SWCNT structures. The unshaded bar portions in FIG. 2a represent % T values measured for each detergent solution absent any raw material. The % T value for the shaded bar portions represent % T values measured for each detergent solution containing SWCNT structures at a time shortly after filtration of the solution. The shaded bar data of FIG. 2a clearly indicates that NP-40, which has the greatest surfactant properties, has a much lover % T value than both SDS and TX-100 and thus provides a substantially more effective dispersion of SWCNT structures in aqueous solution.

To illustrate the effect of detergent concentration on SWCNT dispersion in solution, the solutions containing SWCNT structures were allowed to evaporate from an initial volume of 150 μl to a final volume of 50 μl over a period of 16 hours at room temperature. Intermittent % T measurements were taken, and the results are illustrated in FIG. 2b. The % T values for each solution containing a detergent and SWCNT structures increased with time (i.e., correlating with a decrease in color), which coincided with a noticeable appearance of floccular material in the detergent dispersions thus indicating that nanotubes were beginning to re-associate into larger bundles that were insoluble in water. The test results indicate that, as the detergent concentration increases above its CMC value, micelle formations occur in solution resulting in reduced dispersion of the SWCNT structures. Thus, selection of detergent concentration is very important in maintaining dispersion of the SWCNT structures in solution.

A further test was conducted with solutions prepared in a substantially similar manner as the previous solutions. However, these solutions were stored in sealed vials at room temperature so as to prevent their evaporation. As indicated by the data depicted in FIG. 2c, there was relatively no change in % T value for each of the different detergent solutions and no noticeable appearance of floccular material after a 72 hour period.

The data of example 1 indicates that a strong surfactant such as NP-40 is highly effective in dispersing SWCNT structures in aqueous solutions when utilized in an effective amount. Further, NP-40 can maintain a suitable dispersion of the structures in solution for extended periods of time. Weaker surfactants having HLB values greater than 13.2, such as SDS and TX-100, may provide some dispersion but will not be effective in substantially isolating and purifying SWCNT structures from raw material.

EXAMPLE 2

Aqueous solutions of each of the TA and MβC were prepared alone and with raw materials as follows. Specifically, each solution was prepared by solubilizing 1 mg of the raw material in 1 ml of ddH$_2$O containing 50 mg/ml of either TA or MβC at 50 mg/ml. Each resultant solution was vortexed for 30 minutes at room temperature and then filtered through a 0.2 (μm cellulose acetate filter. The % T values were measured for the filtrates at room temperature in sealed vials for 72 hours and compared with aqueous solutions containing only TA and MβC.

Figure 3:
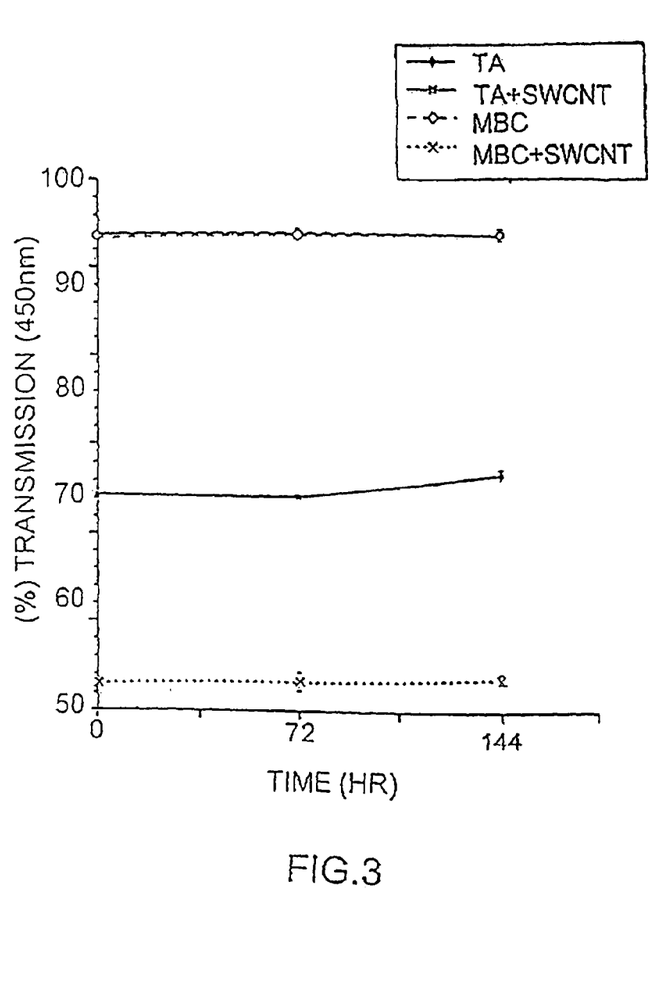
FIG. 3 is a graphical representation of percent transmission ("% T") versus time for aqueous solutions containing taurocholic acid and methyl-β-cyclodextrin.

The % T values illustrated in FIG. 3 reveals that the SWCNT structures remained dispersed in the TA and MβC filtrates for the entire 72 hour period, as is evident from the relatively constant % T values measured for each filtrate over that time period. The data further indicates MβC filtrates had considerably lower % T values, correlating to a greater dispersion of SWCNT structures, than the TA filtrate and the NP-40 filtrate of FIG. 2c. No significant increases in % T values were observed even after a second round of 0.2 μm filtration of each filtrate after the 72 hour period. The results provided in FIG. 3 clearly indicate that both TA and MPβC serve as highly effective dispersal agents, providing substantial dispersion of the SWCNT structures in aqueous solution for extended periods of time.

EXAMPLE 3

SWCNT structures dispersed in the TA and MβC solutions of the previous example were separated from the impurities in solution by centrifugation. Specifically, SWCNT structures sedimented out of a 1 ml volume of either solution having a liquid column height of 2.5 cm at a centrifugation speed of 10,000×g. It is noted that prior SWCNT purification techniques typically require centrifugation speeds in excess of 100,000×g to yield any sedimentation of SWCNT structures.

Figure 4:
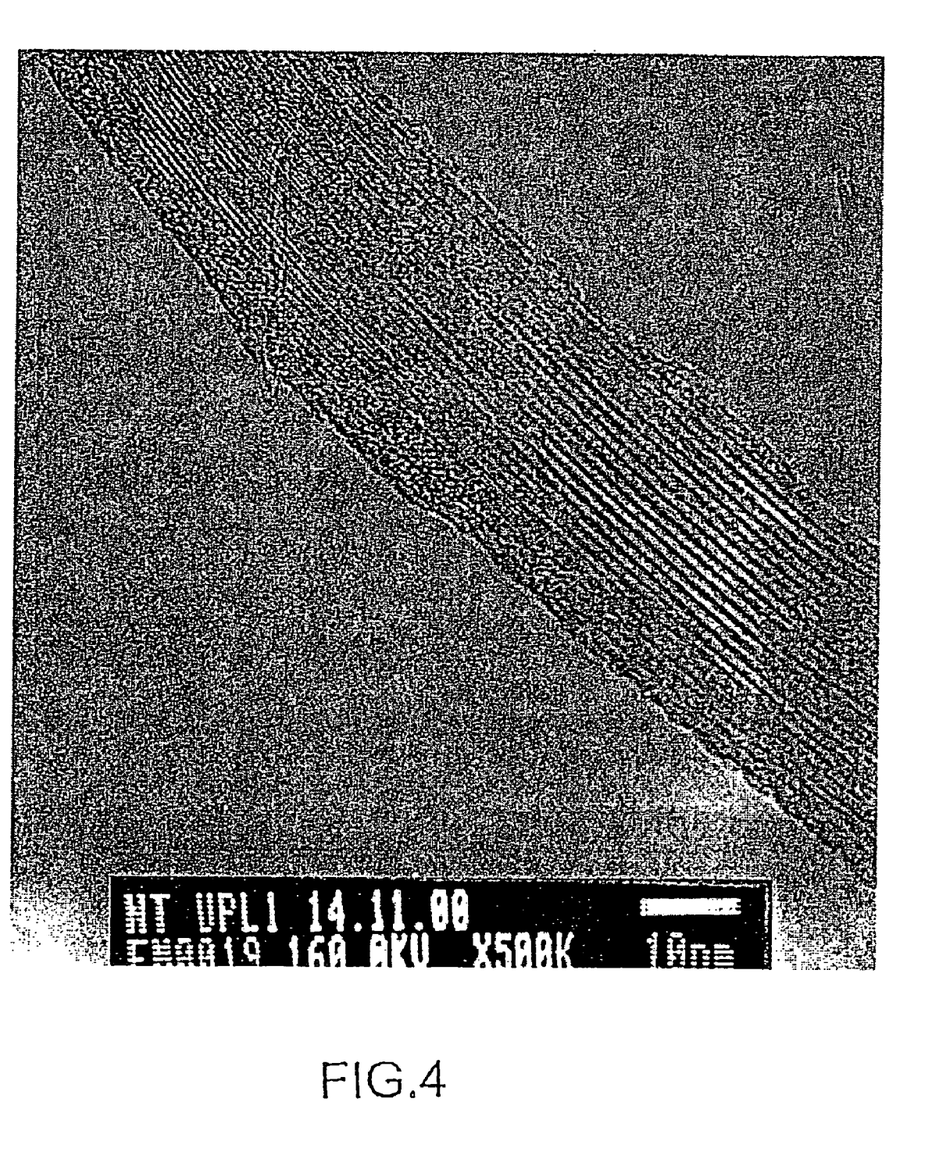
FIG. 4 is a TEM image of "raft-like" SWCNT structures filtered onto a FORMVAR® grid after being dispersed in an aqueous methyl-β-cyclodextrin solution.

The TA and MβC solutions containing SWCNT structures were also subjected to TEM analysis, wherein 50 μl of each solution filtrate was deposited onto a FORMVAR® grid and the liquid was drawn through the FORMVAR® membrane by placing a clean absorbent pad beneath the grid (i.e., by capillary action). As the liquid was drawn through the grid, SWCNT structures formed on the membrane. Images of SWCNT structures were taken at locations where the structures spanned the holes in the membrane. An exemplary TEM image of the grid is depicted in FIG. 4. The images revealed highly organized SWCNT structures that were aligned in parallel "raft-like" formation, rather than tangled together in bundles or ropes. The structures were also free of metal catalyst particles or other impurities. TEM analysis provides a further indication that the SWCNT structures are dispersed as single discrete nanotubes coated with either TA or MβC in the aqueous solutions in order to form the spatial "raft-like" arrangement on the FORMVAR® grid. Additionally, the TEM images revealed that the coating of either TA or MβC on the SWCNT structures promotes repulsion between the individual nanotubes, resulting in spatial separation and parallel "raft-like" formations of individual SWCNT structures wherein the least amount of surface area contact between coated nanotubes is tolerated.

EXAMPLE 4

Figure 5:
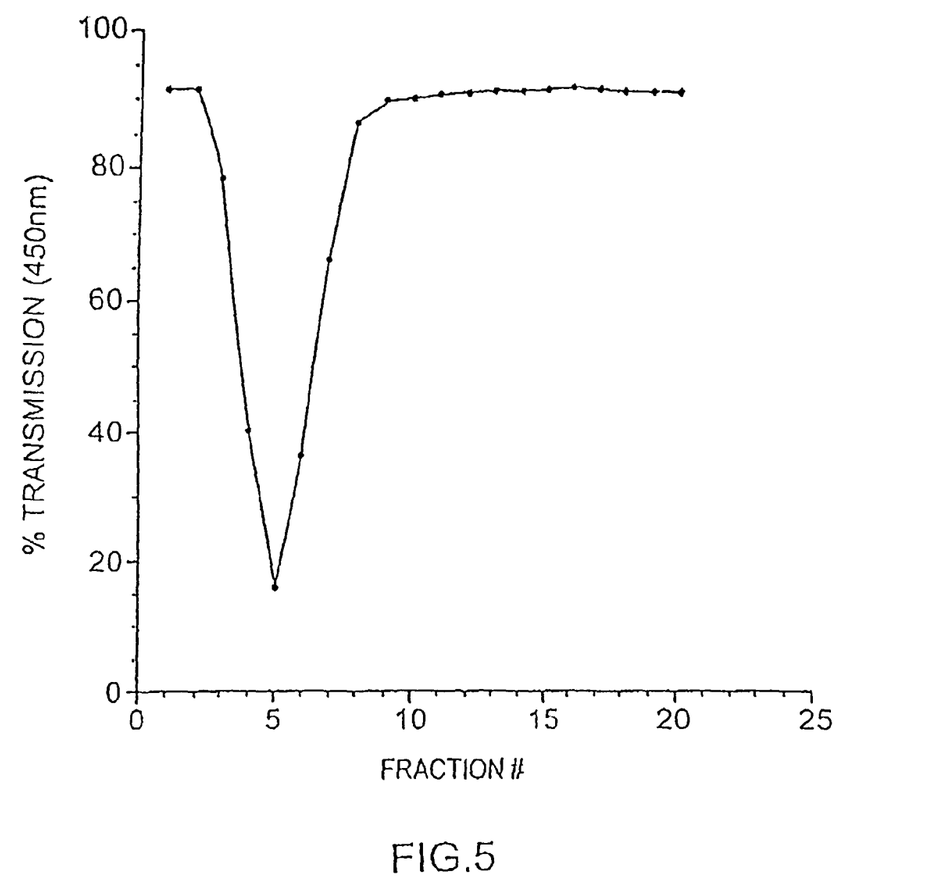
FIG. 5 is a graphical representation of % T values for fractions collected during fractionation of a methyl-β-cyclodextrin solution of dispersed SWCNT structures in a 5000 MW size exclusion column.

Aqueous MβC solutions containing dispersed SWCNT structures were prepared as follows. Two hundred μg of SWCNT containing raw material was solubilized in a 1 ml solution of ddH$_2$O containing 50 mg/ml of MβC. The solution was physically homogenized in a miniaturized inversion blender at about 23,000 RPM. The resultant dispersion was subsequently vortexed for 30 minutes at room temperature followed by 100×g centrifugation for 10 minutes to sediment any remaining insoluble material. The resultant supernatant was then passed through a 5000 MW cut-off gravity-fed size exclusion column (10 ml bed volume) in the following manner. One ml of the dispersed solution was placed on the top of the column, which had been conditioned with 50 ml of ddH$_2$O. One ml fractions were then collected from the base of the column as ddh$_2$O was added to the top of the column. The % T values were measured for each collected fraction. A plot of the % T values versus fraction collected (fractions are sequentially numbered 1 to 20) is illustrated in FIG. 5. Colored fractions, as indicated by the decreasing % T values, were indicative of dispersions in solution. Those colored fractions (i.e., fractions numbered 1 through 10 of FIG. 5) were collected and pooled together. This procedure was conducted to remove excess MβC from the SWCNT dispersions. The resultant solution containing the dispersed SWCNT structures was centrifuged at 10,000×g to sediment SWCNT structures from solution. The supernatant was resuspended in distilled water in preparation for use with the examples described below.

EXAMPLE 5

Figure 6A:
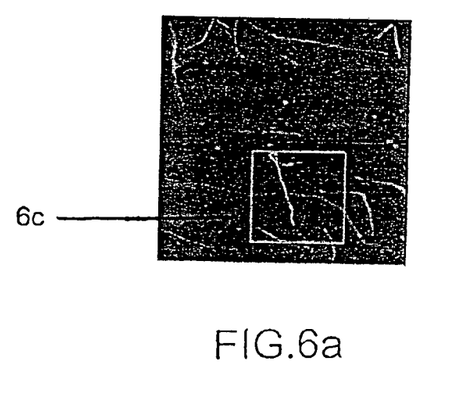
FIGS. 6a-6d depict atomic force microscopy (hereinafter referred to as "AFM") images of SWCNT structures resulting from fractionation of a methyl-β-cyclodextrin solution of dispersed SWCNT structures after deposition on a glass coverslip and air drying at 37° C. for 1 hour.
Figure 6B:
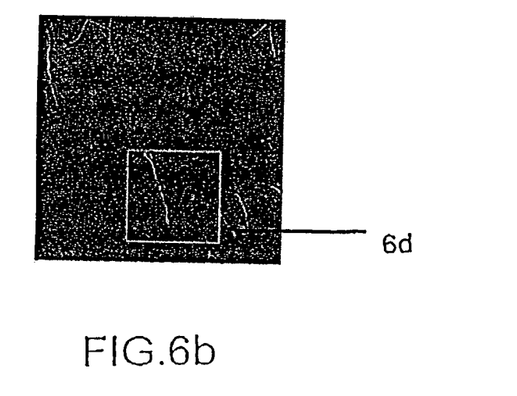
Figure 6C:
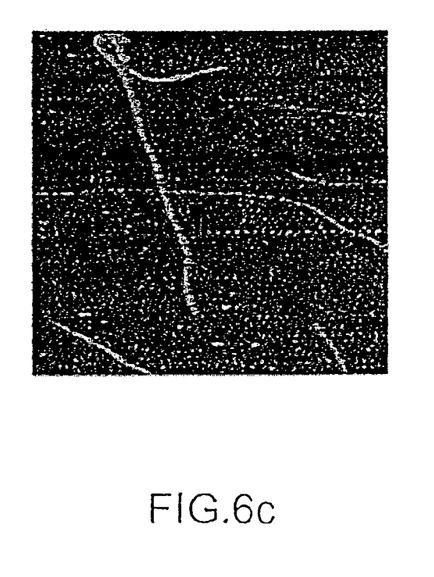
Figure 6D:
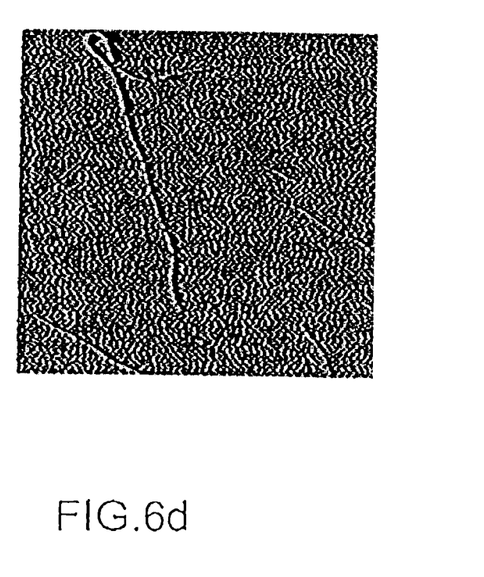

A SWCNT dispersed solution prepared according to the method of Example 4 was continuously washed in order to remove as much MβC as possible prior to AFM analysis. Specifically, the solution was subjected to repeated centrifugation followed by removal of the resultant supernatant and resuspension in distilled water. The centrifugation and washing process was repeated a total of four times to remove any excess MβC from the dispersion. A 25 (μl aliquot of the final washed solution was deposited on a 12 mm glass coverslip and allowed to air dry at 37° C. for one hour. When this surface was analyzed utilizing AFM, imaging revealed the presence of both discretely separated SWCNT structures about 1.4 nm in diameter and larger ropes or bundles of nanotubes about 6-10 nm in diameter as illustrated by the representative AFM image depicted in FIGS. 6a-6d (FIG. 6a depicts the AFM height profile, FIG. 6b depicts the AFM amplitude profile, and FIGS. 6c and 6d are magnifications of FIGS. 6a and 6b, respectively). The AFM images indicate that removal of the majority of MβC from solution by repeated washing resulted in the re-association of some of the SWCNT structures back into ropes or bundles, while other SWCNT structures remained separated and in isolation. In effect, this example illustrates that dispersal of SWCNT structures in an aqueous solution will decrease if the dispersal agent is reduced below an effective amount in solution.

EXAMPLE 6

Figure 7A:
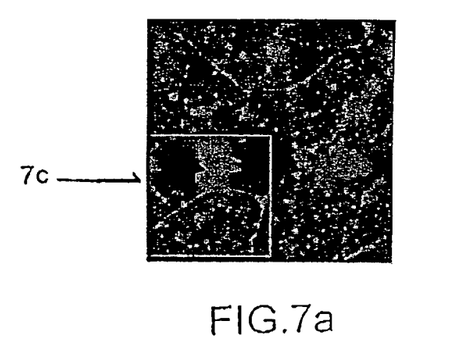
FIGS. 7a-7d depict AFM images of SWCNT structures captured within a layer of PEG coated glass coverslip.
Figure 7B:
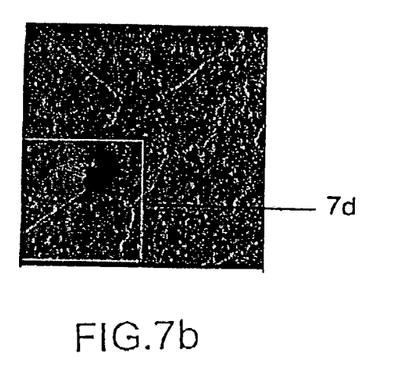
Figure 7C:
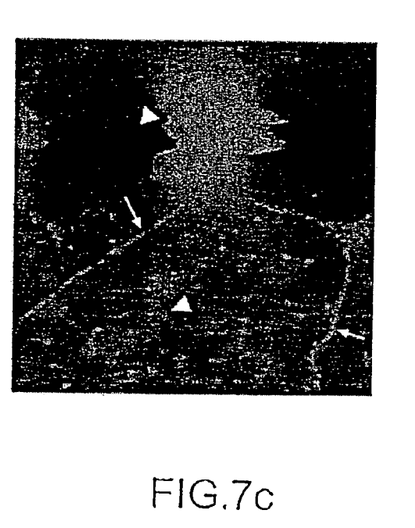
Figure 7D:
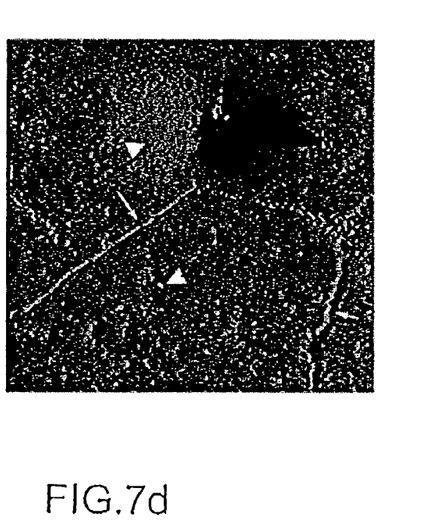

An AFM surface was developed to specifically capture MβC-coated SWCNT structures in a suitable manner to effect proper characterization of the structures. Specifically, the surface of a 12 mm round glass coverslip was coated with a layer of a low molecular weight polyethylene glycol, e.g. PEG-200, available commercially as CarboWax® by Dow Chemical Co., South Charleston, W. Va.), and 25 μl of an aqueous MβC solution containing dispersed SWCNT structures, prepared according to the method of Example 4, was deposited on the coverslip, quickly washed to remove excess MβC and then allowed to air dry at room temperature. When the dried surface was analyzed using AFM imaging, discretely separated SWCNT structures were observed as being attached to the PEG coated surface as illustrated by the representative AFM image depicted in FIGS. 7a-7d (FIG. 7a depicts the AFM height profile, FIG. 7b depicts the AFM amplitude profile, and FIGS. 7c and 7d are magnifications of FIGS. 7a and 7b, respectively). The arrows in FIGS. 7c and 7d identify discretely separated SWCNT structures, whereas the arrow heads identify PEG absorbed on the glass substrate. The AFM images further reveal SWCNT structures from 10-15 μm in length, i.e., verifying that the dispersal methods of the present invention yield SWCNT structures of much greater lengths than the typical 150-250 nm lengths yielded by current isolation and purification techniques. Thus, this example illustrates that SWCNT structures dispersed in aqueous dispersal agent solutions may be fully characterized by capturing the structures on poly-hydroxylated surfaces such as a PEG coated glass coverslip.

EXAMPLE 7

Figure 8A:
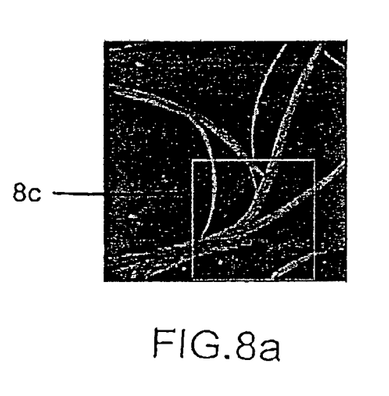
FIGS. 8a-8d depict AFM images of a glass coverslip coated with polyethylene glycol and containing SWCNT "raft-like" structures formed after controlled evaporation of water from a methyl-β-cyclodextrin solution of dispersed SWCNT structures.
Figure 8B:
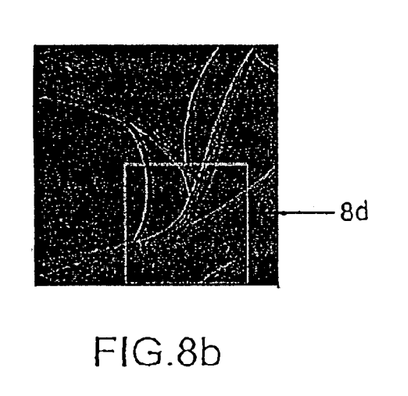
Figure 8C:
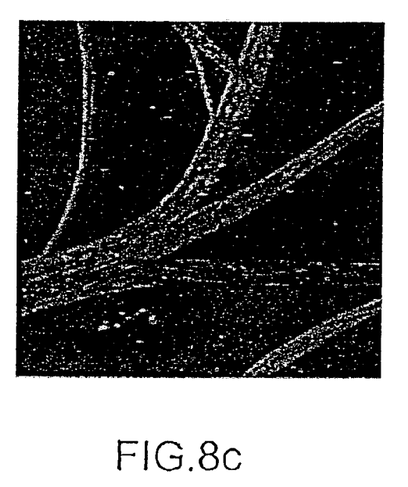
Figure 8D:
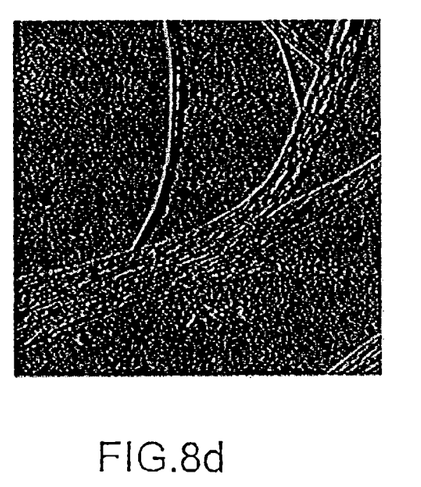

A method of controlled removal by evaporation of the aqueous solution from dispersal agent coated SWCNT structures was conducted to observe the effect on the dispersal of the structures. Specifically, 25 μl samples of an aqueous MβC solution, prepared according to the method of Example 4, were deposited on 12 mm round glass coverslips. The aqueous solutions were allowed to slowly evaporate by air drying over about a 12 hour period. Subsequent AFM analysis of each coverslip revealed MβC coated discrete SWCNT structures forming highly organized "rafts" or "tapes" as illustrated in a representative AFM image depicted in FIGS. 8a-8d (FIG. 8a depicts the AFM height profile, FIG. 8b depicts the AFM amplitude profile, and FIGS. 8c and 8d are magnifications of FIGS. 8a and 8b, respectively). The observed "raft" or "tape" SWCNT structures extended hundreds of microns across the substrate and had various widths ranging up to 1 (μm but were no more than 6 nm in height. Additionally, it was observed that both single layers and multiple layers up to four layers thick of SWCNT structures had formed into highly ordered three-dimensional geometries resembling a crystal structure. Thus, the data confirms that controlled removal of the aqueous solution from the dispersal agent coated SWCNT structures results in the formation of purified and highly ordered, "raft-like" SWCNT structures rather than ropes or bundles of entwined nanotubes.

The present invention provides a significant improvement in the isolation and purification of individual and discrete SWCNT structures by utilizing dispersal agents at effective concentrations to substantially disperse the structures in aqueous solution. Additionally, the present invention provides novel SWCNT structures that are easily characterized and useful for a variety of applications. Further, biological derivitization of the dispersal agent dispersions may be accomplished with relative ease, thus leading to a variety of potential applications for SWCNT structures which may be easily manipulated.

The various technical and scientific terms used herein have meanings that are commonly understood by one of ordinary skill in the art to which the present invention pertains. As is apparent from the foregoing, a wide range of suitable materials and/or methods known to those of skill in the art can be utilized in carrying out the present invention; however, some preferred materials and/or methods have been described. Materials, substrates, and the like to which reference is made in the foregoing description and examples are obtainable from commercial sources, unless otherwise noted. Further, although the foregoing invention has been described in detail by way of illustration and example for purposes of clarity and understanding, these illustrations are merely illustrative and not limiting of the scope of the invention. Other embodiments, changes and modifications, including those obvious to persons skilled in the art, will be within the scope of the following claims.

The invention claimed is:

1. An aqueous solution substantially free of contaminants, comprising substantially isolated and purified carbon nanotubes and at least one dispersal agent, wherein the dispersal agent is (nonylphenoxy) polyethoxy ethanol.

2. An aqueous solution substantially free of contaminants, comprising substantially isolated and purified carbon nanotubes and at least one dispersal agent, wherein the dispersal agent is dodecylpyrimidium chloride.

3. An aqueous solution substantially free of contaminants, comprising substantially isolated and purified carbon nanotubes and at least one dispersal agent, wherein the dispersal agent is a sulfonic acid.

4. The solution of claim 3, wherein the sulfonic acid is 1-heptane-sulfonic acid or 1-octane-sulfonic acid.

5. The solution according to claim 3, wherein the sulfonic acid is in a concentration ranging from about 1 mM to about 100 mM.

* * * * *